US008915584B2

(12) United States Patent
Ihara

(10) Patent No.: US 8,915,584 B2

(45) **Date of Patent: *Dec. 23, 2014**

(54) LIQUID EJECTING APPARATUS AND LIQUID EJECTING METHOD

(71) Applicant: Seiko Epson Corporation, Tokyo (JP)

(72) Inventor: Seiji Ihara, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/095,905

(22) Filed: Dec. 3, 2013

(65) Prior Publication Data

US 2014/0085372 A1 Mar. 27, 2014

Related U.S. Application Data

(63) Continuation of application No. 12/490,529, filed on Jun. 24, 2009, now Pat. No. 8,651,607.

(30) Foreign Application Priority Data

Jun. 30, 2008 (JP) ................................ 2008-171455

(51) Int. Cl.

*C09D 11/00* (2014.01)
*B41J 2/07* (2006.01)
*B41J 2/045* (2006.01)

(52) U.S. Cl.

CPC .............. *B41J 2/072* (2013.01); *B41J 2/04528* (2013.01); *B41J 2/0454* (2013.01); *B41J 2/04563* (2013.01); *B41J 2/0458* (2013.01); *B41J 2/04581* (2013.01); *B41J 2/04588* (2013.01); *B41J 2/0459* (2013.01); *B41J 2/04593* (2013.01)

USPC .......................................................... 347/100

(58) Field of Classification Search

CPC .. B41J 2/04528; B41J 2/0454; B41J 2/04563; B41J 2/0458; B41J 2/04581

USPC ........................................................... 347/14

See application file for complete search history.

(56) References Cited

U.S. PATENT DOCUMENTS

| | | | | |
|---|---|---|---|---|
| 6,457,794 | B1 | 10/2002 | Tajika et al. | |
| 6,530,636 | B1 * | 3/2003 | Asauchi | 347/14 |
| 7,203,439 | B2 | 4/2007 | Sone et al. | |
| 8,651,607 | B2 * | 2/2014 | Ihara | 347/14 |
| 2003/0081071 | A1 | 5/2003 | Giere et al. | |
| 2004/0135832 | A1 | 7/2004 | Usuda | |
| 2006/0012645 | A1 | 1/2006 | Nagashima | |
| 2006/0125851 | A1 | 6/2006 | Hwang | |

FOREIGN PATENT DOCUMENTS

| | | |
|---|---|---|
| JP | 55-069464 | 5/1980 |
| JP | 55-084670 | 6/1980 |
| JP | 62-173259 | 7/1987 |
| JP | 08-72235 | 3/1996 |
| JP | 08/207262 A | 8/1996 |
| JP | 09-039268 A | 10/1997 |

(Continued)

*Primary Examiner* — Laura Martin

(74) *Attorney, Agent, or Firm* — Workman Nydegger

(57) ABSTRACT

A liquid ejecting apparatus includes: a heating unit which heats a medium; a head which ejects liquid droplets onto the medium opposed thereto; and a driving signal generating unit which generates a driving signal to be applied to the head in order to eject the liquid droplets and which generates a driving signal different in accordance with whether the heating unit is used.

8 Claims, 13 Drawing Sheets

(56) References Cited

FOREIGN PATENT DOCUMENTS

| | | | |
|---|---|---|---|
| JP | 2003-182056 | | 7/2003 |
| JP | 2003-182168 | | 7/2003 |
| JP | 2004-216758 | A | 8/2004 |

* cited by examiner

□ RELATION BETWEEN TEMPERATURE OF THERMISTOR AND AMBIENT TEMPERATURE

| AMBIENT TEMPERATURE | 20 | 25 | 30 | 35 |
|---|---|---|---|---|
| THERMISTOR | 26 | 30 | 34 | 38 |

□ RELATION BETWEEN TEMPERATURE OF THERMISTOR AND CORRECTION VALUE

| TEMPERATURE OF THERMISTOR | 26 | 30 | 34 | 38 |
|---|---|---|---|---|
| CORRECTION VALUE | 14 | 13 | 9 | 7 |

| | KINDS OF MEDIA | | | |
|---|---|---|---|---|
| KINDS OF INK | | FILM | SHEET (SHEET THICKNESS IS THIN) | SHEET (SHEET THICKNESS IS THICK) |
| | WATER-BASED INK | 50°C | 45°C | OFF |
| | OIL-BASED INK | 50°C | 50°C | 45°C |

□ VARIATION IN TEMPERATURE OF THERMISTOR AT EACH AMBIENT TEMPERATURE

| ELAPSED TIME (min) | TEMPERATURE OF THERMISTOR AMBIENT TEMPERATURE 20°C | AMBIENT TEMPERATURE 25°C | AMBIENT TEMPERATURE 30°C | AMBIENT TEMPERATURE 35°C |
|---|---|---|---|---|
| 0 | 20 | 25 | 30 | 35 |
| 5 | 22 | 26 | 31 | 35 |
| 10 | 25 | 28 | 32 | 37 |
| 15 | 26 | 29 | 33 | 38 |
| 20 | 26 | 30 | 34 | 38 |
| 25 | 25 | 30 | 34 | 38 |
| 30 | 26 | 29 | 34 | 39 |
| 35 | 26 | 30 | 34 | 38 |
| 40 | 26 | 29 | 34 | 38 |
| 45 | 27 | 29 | 35 | 37 |
| 50 | 26 | 30 | 34 | 38 |
| 55 | 27 | 30 | 34 | 38 |
| 60 | 26 | 30 | 34 | 38 |

FIG. 14

□ VARIATION IN RESPECTIVE TEMPERATURES AT EACH AMBIENT TEMPERATURE

SETTING TEMPERATURE OF PLATEN HEATER: 45°C

| ELAPSED TIME (min) | TEMPERATURE OF THERMISTOR | | | | TEMPERATURE OF VICINITY OF NOZZLES | | | | CORRECTION VALUE (TEMPERATURE OF VICINITY OF NOZZLES − TEMPERATURE OF THERMISTOR) | | | |
|---|---|---|---|---|---|---|---|---|---|---|---|---|
| | AMBIENT TEMPERATURE 20°C (T) | AMBIENT TEMPERATURE 25°C (T) | AMBIENT TEMPERATURE 30°C (T) | AMBIENT TEMPERATURE 35°C (T) | AMBIENT TEMPERATURE 20°C (N) | AMBIENT TEMPERATURE 25°C (N) | AMBIENT TEMPERATURE 30°C (N) | AMBIENT TEMPERATURE 35°C (N) | AMBIENT TEMPERATURE 20°C (N) | AMBIENT TEMPERATURE 25°C (N) | AMBIENT TEMPERATURE 30°C (N) | AMBIENT TEMPERATURE 35°C (N) |
| 0 | 20 | 25 | 30 | 35 | 21 | 24 | 31 | 34 | 1 | −1 | 1 | −1 |
| 5 | 22 | 26 | 31 | 35 | 27 | 28 | 36 | 37 | 5 | 2 | 5 | 2 |
| 10 | 25 | 28 | 32 | 37 | 32 | 35 | 40 | 42 | 7 | 7 | 8 | 5 |
| 15 | 26 | 29 | 33 | 38 | 36 | 37 | 41 | 42 | 10 | 8 | 8 | 4 |
| 20 | 26 | 30 | 34 | 38 | 39 | 41 | 43 | 43 | 13 | 11 | 9 | 5 |
| 25 | 25 | 30 | 34 | 38 | 41 | 43 | 43 | 45 | 16 | 13 | 9 | 7 |
| 30 | 26 | 29 | 34 | 39 | 39 | 42 | 42 | 44 | 13 | 13 | 8 | 5 |
| 35 | 26 | 30 | 34 | 38 | 40 | 43 | 44 | 45 | 14 | 13 | 10 | 7 |
| 40 | 26 | 29 | 34 | 38 | 42 | 42 | 45 | 45 | 16 | 13 | 11 | 7 |
| 45 | 27 | 29 | 35 | 37 | 41 | 41 | 44 | 46 | 14 | 12 | 9 | 9 |
| 50 | 26 | 30 | 34 | 38 | 39 | 42 | 42 | 45 | 13 | 12 | 8 | 7 |
| 55 | 27 | 30 | 34 | 38 | 40 | 43 | 43 | 44 | 13 | 13 | 9 | 6 |
| 60 | 26 | 30 | 34 | 38 | 41 | 42 | 42 | 45 | 15 | 12 | 8 | 7 |
| | 26 | 30 | 34 | 38 | | | | | 14 | 13 | 9 | 7 |

AVERAGE VALUE OF TEMPERATURES OF THERMISTOR AFTER TEMPERATURE STABILIZATION

AVERAGE VALUE OF CORRECTION VALUES AFTER TEMPERATURE STABILIZATION

LIQUID EJECTING APPARATUS AND LIQUID EJECTING METHOD

CROSS REFERENCES TO RELATED APPLICATIONS

This application is a Continuation of U.S. patent application Ser. No. 12/490,529 filed Jun. 24, 2009 (which patent application is incorporated herein by reference in its entirety), which claims the benefit of Japanese Patent Application No. 2008-171455, filed Jun. 30, 2008 (which is also expressly incorporated herein by reference in its entirety).

BACKGROUND

1. Technical Field

The present invention relates to a liquid ejecting apparatus and a liquid ejecting method.

2. Related Art

Ink jet printing apparatuses forming an image on a medium by ejecting ink droplets from nozzles have been come into wide use. Among the ink jet printing apparatuses, there is an ink jet printing apparatus heating the medium in order to dry ink droplets landed onto the medium faster.

JP-A-55-69464, JP-A-55-84670, and JP-62-173259 are examples of the related art.

However, when the medium is heated in order to dry the ink droplets landed onto the medium faster, the temperature of the ink ejected may be changed under an influence of the heating. When the temperature of the ink is changed, the viscosity of the ink may be changed. For this reason, an appropriate amount of ink droplets cannot be ejected.

SUMMARY

An advantage of some aspects of the invention is that it provides a liquid ejecting apparatus and a liquid ejecting method capable of ejecting an appropriate amount of liquid droplets even when a medium is heated.

According to an aspect of the invention, there is provided a liquid ejecting apparatus including: a heating unit which heats a medium; a head which ejects liquid droplets onto the medium opposed thereto; and a driving signal generating unit which generates a driving signal to be applied to the head in order to eject the liquid droplets and which generates a driving signal different in accordance with whether the heating unit is used.

Other aspects of the invention are apparent from the specification and the accompanying drawings of the invention.

BRIEF DESCRIPTION OF THE DRAWINGS

The invention will be described with reference to the accompanying drawings, wherein like numbers reference like elements.

FIG. 14 is a table showing the variation in the temperature of the thermistor in accordance with the ambient temperature, a variation in the temperature of the vicinity of the nozzles, and a correction value for the variations.

DESCRIPTION OF EXEMPLARY EMBODIMENTS

The following aspects of the invention are apparent from the specification and the accompanying drawings of the invention.

According to an aspect of the invention, there is provided a liquid ejecting apparatus including: a heating unit which heats a medium; a head which ejects liquid droplets onto the medium opposed thereto; and a driving signal generating unit which generates a driving signal to be applied to the head in order to eject the liquid droplets and which generates a driving signal different in accordance with whether the heating unit is used.

With such a configuration, an appropriate amount of liquid droplets can be ejected even when the medium is heated.

The liquid ejecting apparatus may further include a sensor which outputs temperature information on a temperature of the head. The driving signal generating unit may generate a driving signal of which a waveform is corrected on the basis of the temperature information output by the sensor. In addition, the temperature information may be corrected upon using the heating unit and the driving signal generating unit may generate a driving signal of which a waveform is on the basis of the corrected temperature information. When the temperature information is corrected upon using the heating unit, a method of correcting the temperature information may be different in accordance with whether an ejection amount of liquid droplets ejected onto the medium exceeds a predetermined amount. The correction of the temperature information may be performed using a correction expression different depending on a location where the heating unit is provided.

The sensor may be mounted on an upper portion of the head. The heating unit may be disposed at a location opposed to ejection ports for the liquid droplets in the head.

With such a configuration, the appropriate amount of liquid droplets can be ejected even when the medium is heated.

According to another aspect of the invention, there is provided a liquid ejecting method including: generating a driving signal different in accordance with whether a heating unit heating a medium is used; and ejecting liquid droplets onto the medium opposed to the head by applying the driving signal to the head.

With such a method, the appropriate amount of liquid droplets can be ejected even when the medium is heated.

Embodiment

Figure 1:
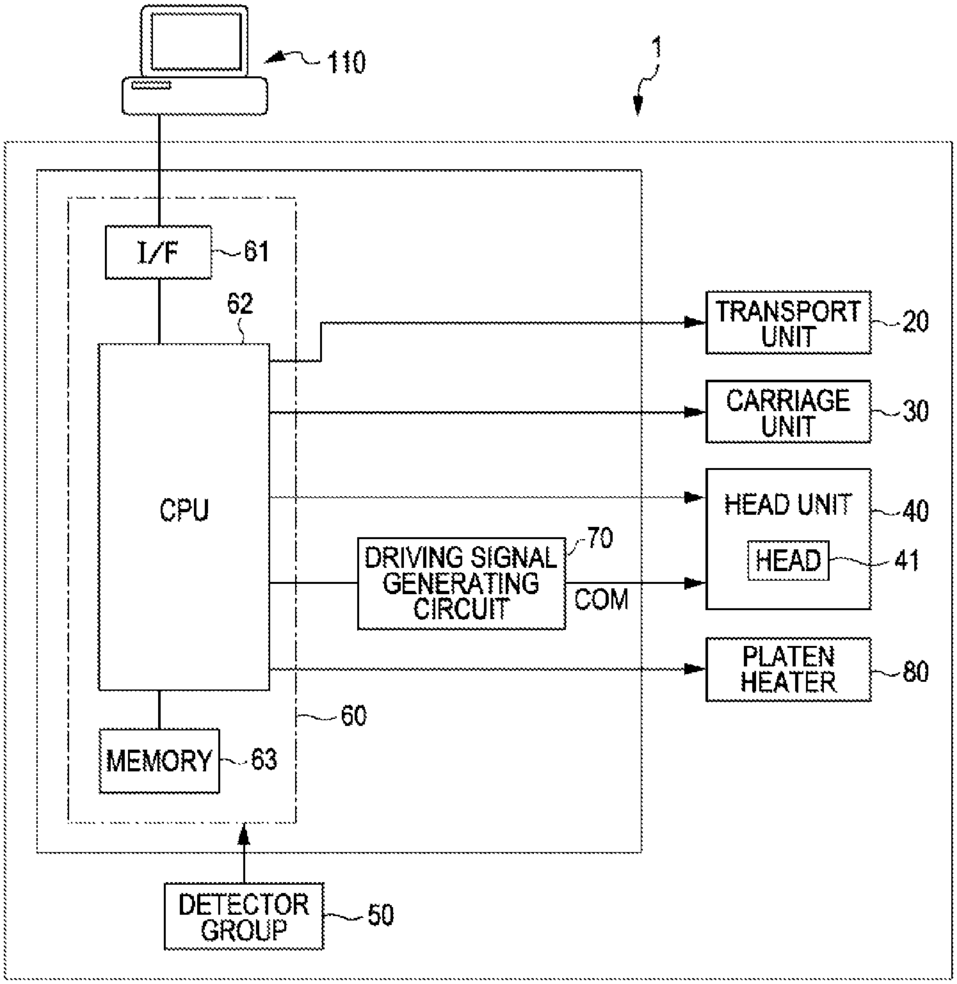
FIG. 1 is a block diagram illustrating the overall configuration of a printer.
Figure 2A:
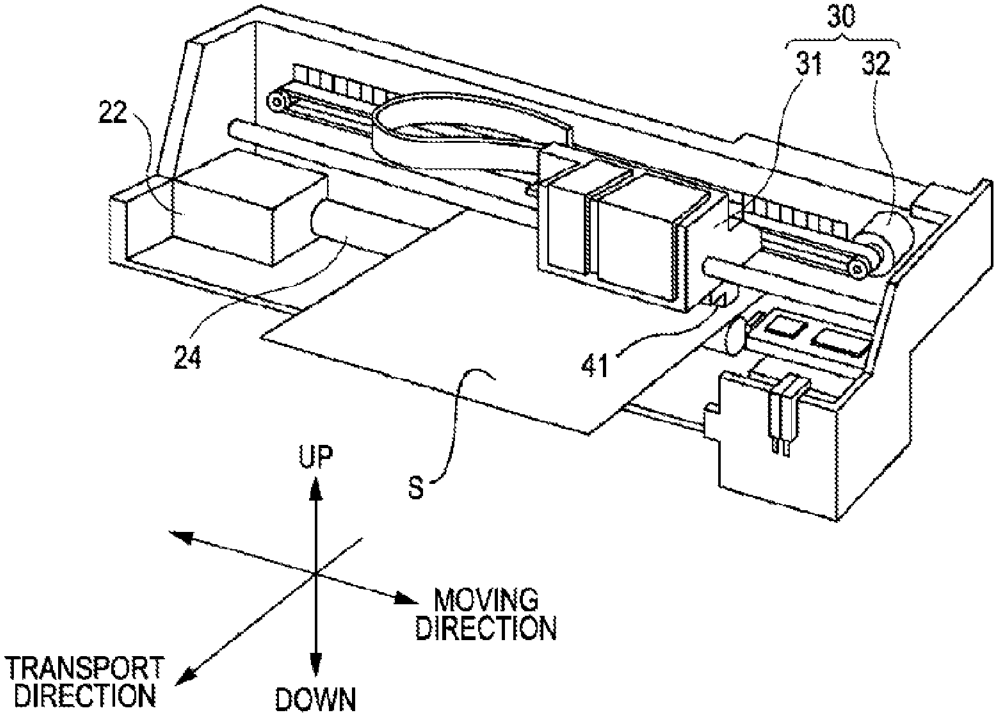
FIG. 2A is a schematic diagram illustrating the overall configuration of the printer.
Figure 2B:
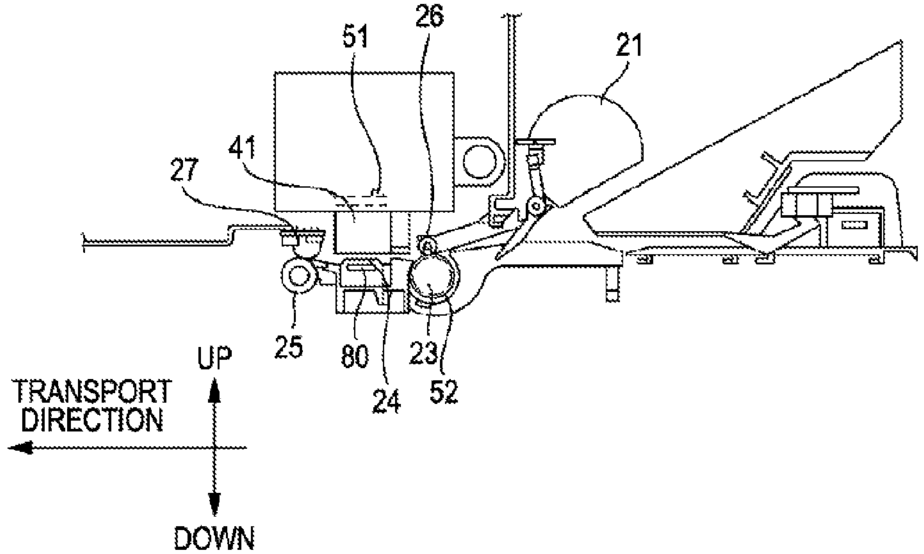
FIG. 2B is a transverse cross-sectional view illustrating the overall configuration of the printer.

FIG. 1 is a block diagram illustrating the overall configuration of a printer 1. FIG. 2A is a schematic diagram illustrating the overall configuration of the printer 1. FIG. 2B is a transverse cross-sectional view illustrating the overall configuration of the printer 1.

The printer 1 includes a transport unit 20, a carriage unit 30, a head unit 40, a detector group 50, a controller 60, a driving signal generating circuit 70, and a platen heater 80.

The printer 1 allows the controller 60 to control the units (the transport unit 20, the carriage unit 30, the head unit 40, the driving signal generating circuit 70, and the platen heater 80). The controller 60 controls the units on the basis of print data received from the computer 110 and prints an image on a medium such as a sheet S.

The transport unit 20 transports the sheet S in a predetermined direction (hereinafter, referred to as a transport direction). The transport unit 20 includes a feeding roller 21, a transport motor 22, a transport roller 23, a platen 24, and a discharge roller 25. The feeding roller 21 is a roller which feeds the sheet S inserted into a sheet insertion port to the inside of the printer 1. The transport roller 23 is a roller which transports the sheet S fed by the feeding roller 21 up to a printable area and is driven by a transport motor 22. The platen 24 supports the sheet S during a printing process. In some cases, the platen 24 is heated by a platen heater 80 described below. The discharge roller 25 is a roller which discharges the sheet S to the outside of the printer 1 and is disposed on a downstream side of the printable area in the transport direction. The discharge roller 25 rotates in synchronization with the transport roller 23.

The carriage unit 30 moves a head in a predetermined direction (a movement direction in the drawings). The carriage unit 30 includes a carriage 31 and a carriage motor 32. The carriage 31 is able to reciprocate in the movement direction and driven by the carriage motor 32. The carriage 31 maintains an ink cartridge storing ink so as to be detachably mounted.

The head unit 40 is a unit which ejects the ink onto the sheet. The head unit 40 includes a head 41 having a plurality of nozzles. The head 41 is provided in the carriage 31. Therefore, when the carriage 31 is moved in the movement direction, the head 41 is also moved in the movement direction. Dot lines (raster lines) in the transport direction are formed on the sheet by allowing the head 41 to intermittently eject the ink while being moved in the transport direction. The inside structure of the head 41 is described below.

The detector group 50 includes a thermistor 51. The thermistor 51 is provided in the upper portion of the head 41 and inside the carriage 31, as described below. A temperature (corresponding to temperature information) detected by the thermistor 51 is sent to the controller 60.

The controller 60 is a unit which controls the printer. The controller 60 includes an interface 61, a CPU 62, and a memory 63. The interface 61 transmits or receives data between a computer 110 as an external apparatus and the printer 1. The CPU 62 is an arithmetic processing unit which controls the printer 1 as a whole. The memory 63 is a unit which ensures an area for storing programs of the CPU 62, a working area, and the like and includes a storage element such as a RAM or an EEPROM. The CPU 62 controls the units in accordance with the programs stored in the memory 63.

The driving signal generating circuit 70 generates a driving signal which is applied to a driving element such as a piezo element included in the head 41, which is described below, to eject ink droplets. The driving signal generating circuit 70 includes a DAC (not shown). The driving signal generating circuit 70 generates an analog voltage signal on the basis of digital data on the waveform of the driving signal sent from the controller 60. In addition, the driving signal generating circuit 70 also includes an amplifying circuit (not shown) and generates a driving signal COM by amplifying the generated voltage signal. The waveform of the driving signal is described below.

The platen heater 80 is a unit which heats the sheet S passing through a location above the platen heater 80. The platen heater 80 is connected to the controller 60 and controlled so as to become a predetermined temperature (here, 45° C.) when turned on. The platen heater 80 is provided at a location opposed to the head 41, which is described below, and configured so as to heat the sheet S passing through the location above the platen 24 by heating the platen 24. In addition, the platen heater 80 corresponds to a heating unit.

The computer 110 sends print data on an image to be printed by the printer 1 through a printer driver installed thereon. The print data contains pixel data indicating whether a dot having a certain size in each pixel is formed on the sheet.

Head 41

Figure 3:
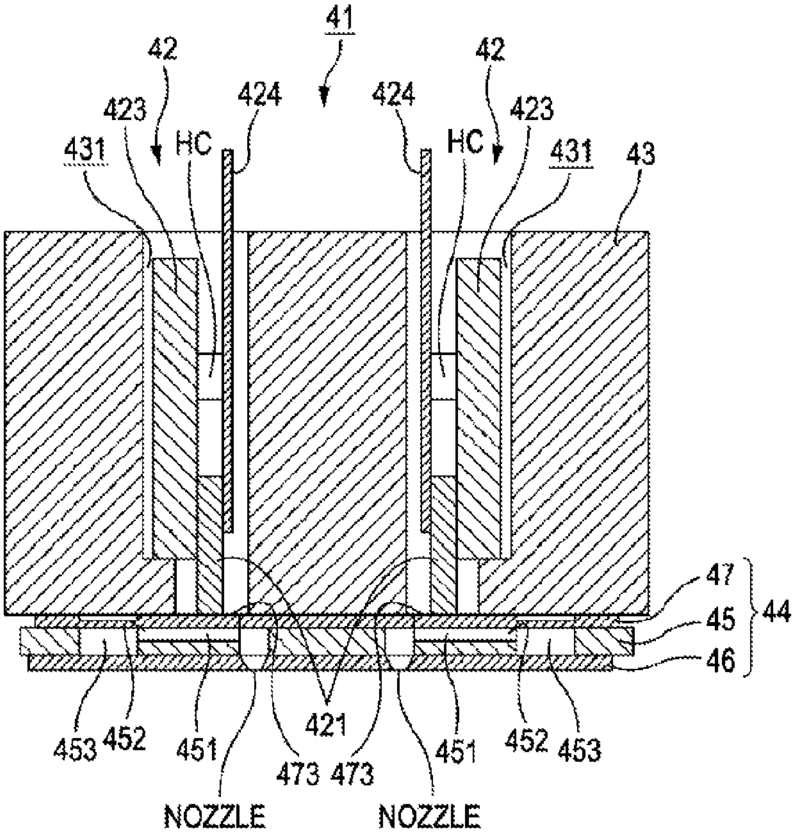
FIG. 3 is a sectional view illustrating the vicinity of two nozzle groups in a head.

FIG. 3 is a sectional view illustrating the vicinity of two nozzle groups in the head 41. Here, the cross-section of the nozzle groups of two rows in which a plurality of nozzles are arranged in a direction facing the surface of the drawing is shown. The head 41 includes driving units 42, a case 43 accommodating the driving units 42, and a flow passage unit 44 mounted on the case 43.

Each of the driving units 42 includes a piezo element group constituted by a plurality of piezo elements 421, a fixation plate 423 to which the piezo element group is fixed, and a flexible cable 424 feeding electricity to the piezo elements 421. Each of the piezo elements 421 is mounted on the fixation plate 423 in a so-called cantilever state. The fixation plate 423 is a plate-shaped member which has a rigidity property capable of receiving a reactive force from the piezo elements 421. The flexible cable 424 is a sheet-shaped wiring board which has a flexible property and is electrically connected to the piezo elements 421 in a side surface of a fixation end opposite to the fixation plate 423. On the surface of the flexible cable 424, a head controller HC as a control IC for controlling drive of the piezo elements 421 is mounted. As illustrated, the head controller HC is provided in each of the nozzle groups.

The case 43 has an outer rectangular convex shape having accommodation hollow portions 431 which are each capable of accommodating the driving unit 42. A flow passage unit 44 is joined to the front end surface of the case 43. The accommodation hollow portion 431 has a size to which the driving unit 42 can be exactly fitted. In the case 43, an ink supply pipe (not shown) for introducing ink into the flow passage unit 44 from an ink cartridge is also formed.

The flow passage unit 44 includes a flow passage forming board 45, a nozzle plate 46, and an elastic plate 47 and is integrally formed by stacking the flow passage forming board 45, the nozzle plate 46, and the elastic plate 47 in such a manner that the flow passage forming board 45 is interposed between the nozzle plate 46 and the elastic plate 47. The nozzle plate 46 is a thin plate made of stainless steel in which the nozzles are formed.

In the flow passage forming board 45, a plurality of hollow portions which become pressure chambers 451 and ink supply ports 452 are individually formed in correspondence with the nozzles. Each of reservoirs 453 is a liquid storage chamber supplying the ink stored in the ink cartridge to the pressure chamber 451 and communicates with the other end of the pressure chamber 451 through the ink supply port 452. In addition, it is configured that the ink from the ink cartridge passes through the ink supply pipe to be introduced into the reservoir 453.

In the driving unit 42, free end portions of the piezo elements 421 are inserted into the accommodation hollow portion 431 in a state where the free end portions are oriented toward the flow passage unit 44, and are adhered to an island portion 473 to which the front end surfaces of the free end portions correspond. The rear surface of the fixation plate 423 is adhered to the inner wall surface of the case 43 which partitions the accommodation hollow portions 431. When the driving signal is supplied to the piezo elements 421 via the flexible cable 424 in this accommodation state, the piezo elements 421 expand or contract the volume of the pressure chamber 451. A variation in the volume of the pressure chamber 451 results in a pressure variation of the ink in the pressure chamber 451. By utilizing the pressure variation of the ink, it is possible to eject ink droplets from the nozzles.

Driving Signal COM

Figure 4:
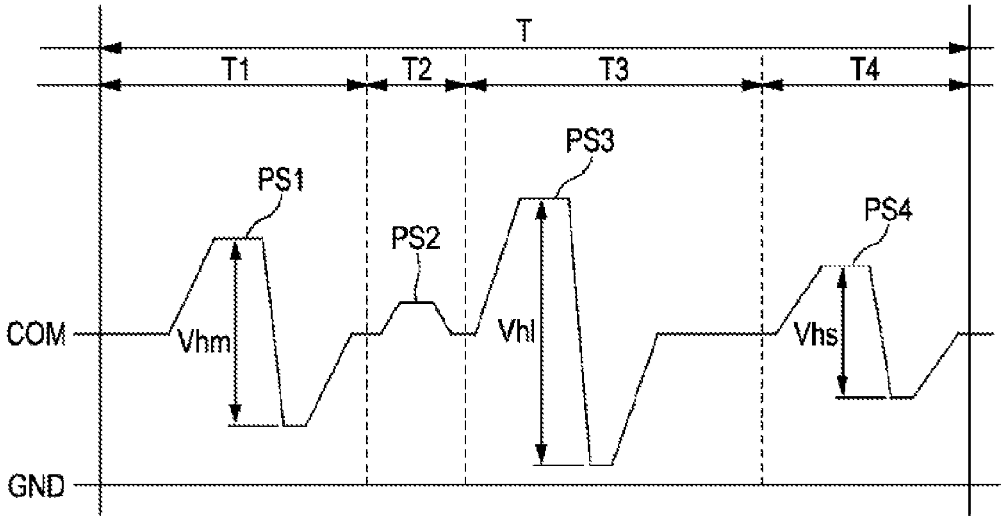
FIG. 4 is a diagram for explaining an example of a driving signal generated by a driving signal generating circuit.

FIG. 4 is a diagram explaining an example of the driving signal COM generated by the driving signal generating circuit 70. As shown in FIG. 4, the driving signal COM is repeatedly generated in at every repetition period T.

The period T as a repetition period corresponds to a period during which the nozzles are moved by one pixel. For example, when a print resolution is 720 dpi, the period T corresponds to a period during which the nozzles are moved by 1/720 inch with respect to the sheet S. By applying driving pulses PS1 to PS4 of sections contained in the period T to the piezo elements 421 on the basis of the pixel data contained in the print data, the ink droplets having different sizes are ejected in one pixel to express a plurality of gray scales.

The driving signal COM includes the driving pulse PS1 generated in a section T1 of the repetition period, the driving pulse PS2 generated in a section T2, the driving pulse PS3 generated in a section T3, and the driving pulse PS4 generated in a section T4.

In FIG. 4, the amplitude of the driving pulse PS1 is denoted by Vhm. In addition, in FIG. 4, the amplitude of the driving pulse PS3 is denoted by Vhl and the amplitude of the driving pulse PS4 is denoted by Vhs. Since the larger the amplitude of the driving pulse is, the larger a variation degree of the piezo elements 421 is, the ink droplets having a big size can be ejected. Accordingly, the ink droplets having sizes corresponding to the respective driving pulses are ejected. In FIG. 4, the amplitude Vhl of the driving pulse PS3 is the largest and the amplitude vhm of the driving pulse PS4 is the second largest. The amplitude Vhs of the driving pulse PS1 is the third largest.

Accordingly, upon forming a small-sized dot, the driving pulse PS4 is applied to the piezo elements 421. Upon forming a middle-sized dot, the driving pulse PS1 is applied to the piezo elements 421. Upon forming a large-sized dot, the driving pulse PS3 is applied to the piezo elements 421. The driving pulse PS2 is a minute vibration pulse used to make a meniscus vibrate minutely and is applied to the piezo elements 421 in a case of no dot. In this way, the driving pulse PS4 is used to eject the ink droplets for the small-sized dot, the driving pulse PS1 is used to eject the ink droplets for the middle-sized dot, and the driving pulse PS3 is used to eject the ink droplets for the large-sized dot.

Waveform Data of Driving Pulse

Figure 5A:
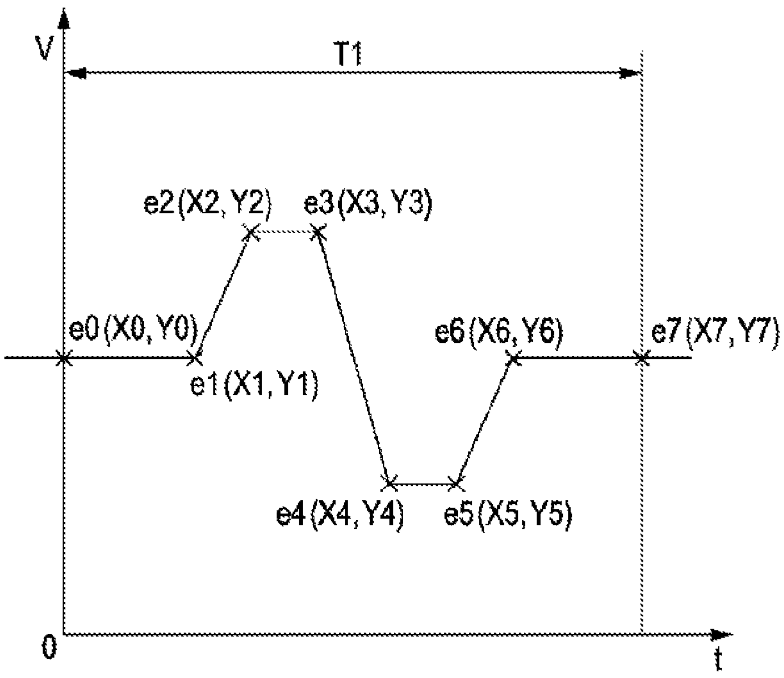
FIG. 5A is a diagram for explaining waveform data of a driving pulse.

FIG. 5A is a diagram for explaining waveform data of the driving pulses. In FIG. 5A, the waveform of the driving pulse PS1 in the section T1 is shown. Coordinates e0 to e7 at points of the waveform of the driving pulse PS1 are shown. When the driving signal COM is generated, coordinate data on the waveform of the driving signal are sent from the controller 60. The driving signal generating circuit 70 generates the driving signal having the waveform in which the coordinates of the respective coordinate data are linked to each other by interpolating a space between the coordinate points on the basis of the sent coordinate data. That is, when the coordinate data sent from the controller 60 are varied, the driving signal is also varied.

For example, when it is desired to enlarge the amplitude of the driving pulse, the values of Y2 and Y3 are made large and the values of Y4 and Y5 are made low in the drawing. In this way, since the amplitude of the driving pulse is enlarged, the displacement of the piezo elements 421 to be applied becomes larger. Alternatively, when it is desired to reduce the amplitude of the driving pulse, the values of Y2 and Y3 are made low and the value of Y4 and Y5 are made large in the drawing. In this way, since the amplitude of the driving pulse is reduced, the displacement of the piezo elements 421 to be applied becomes smaller. In consequence, a desired driving pulse can be generated.

The viscosity of ink used according to this embodiment is varied in accordance with the temperature of the ink. When the viscosity of the ink is low, it is easy to eject ink droplets from the nozzles. However, when the viscosity of the ink is high, it is difficult to eject ink droplet from the nozzles. For this reason, when the temperature of the ink is different, an ejection amount of ink droplets becomes different even upon applying the same driving signal to the piezo elements 421. Specifically, even when the same driving signal is applied to the piezo elements 421, the ink droplets having a larger size are ejected at the high temperature of the ink (the low viscosity) than at the low temperature of the ink is (the high viscosity).

When the ejection amount of ink droplets is different in accordance with the temperature of the ink, an image formed on a medium becomes different depending on the temperature of the ink. In order to prevent this problem, in this embodiment, the driving signal different depending on the temperature of the ink is generated to be applied to the piezo elements 421.

Figure 5B:
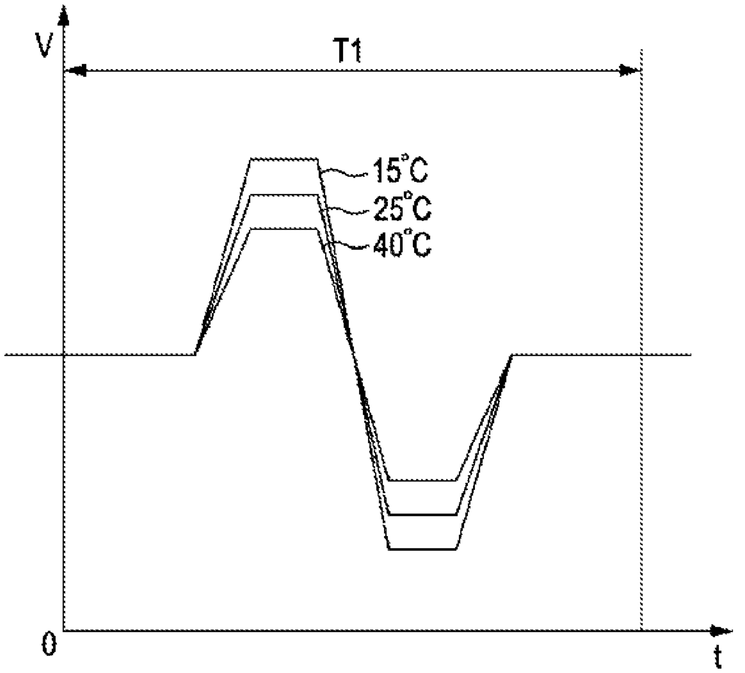
FIG. 5B is a diagram for explaining a driving pulse varied in accordance with the temperature of ink.

FIG. 5B is a diagram for explaining the driving pulse PS1 varied in accordance with the temperature of the ink. In FIG. 5B, the driving pulse PS1 generated at 15° C., the driving pulse PS1 generated at 25° C., and the driving pulse PS1 generated at 40° C. are shown. As shown in FIG. 5B, the amplitude of the driving pulse PS1 generated at a relatively lower temperature (15° C.) is larger than that of the driving pulse PS1 generated at a relative higher temperature (40° C.). In this way, the driving signal is generated in accordance with the temperature of the ink. In addition, the ink droplets having a uniform size can be ejected at any temperature.

Here, the driving pulse PS1 in the section T1 has been described as an example. Similarly, the other driving pulses PS2 to PS4 are also generated in accordance with the temperature of the ink so as to eject the ink droplet having the same size even at a different temperature. In addition, the driving signal COM is generated in accordance with the temperature of the ink.

Temperature Tth of Thermistor and Temperature Tnz of Vicinity of Nozzles

Figure 6:
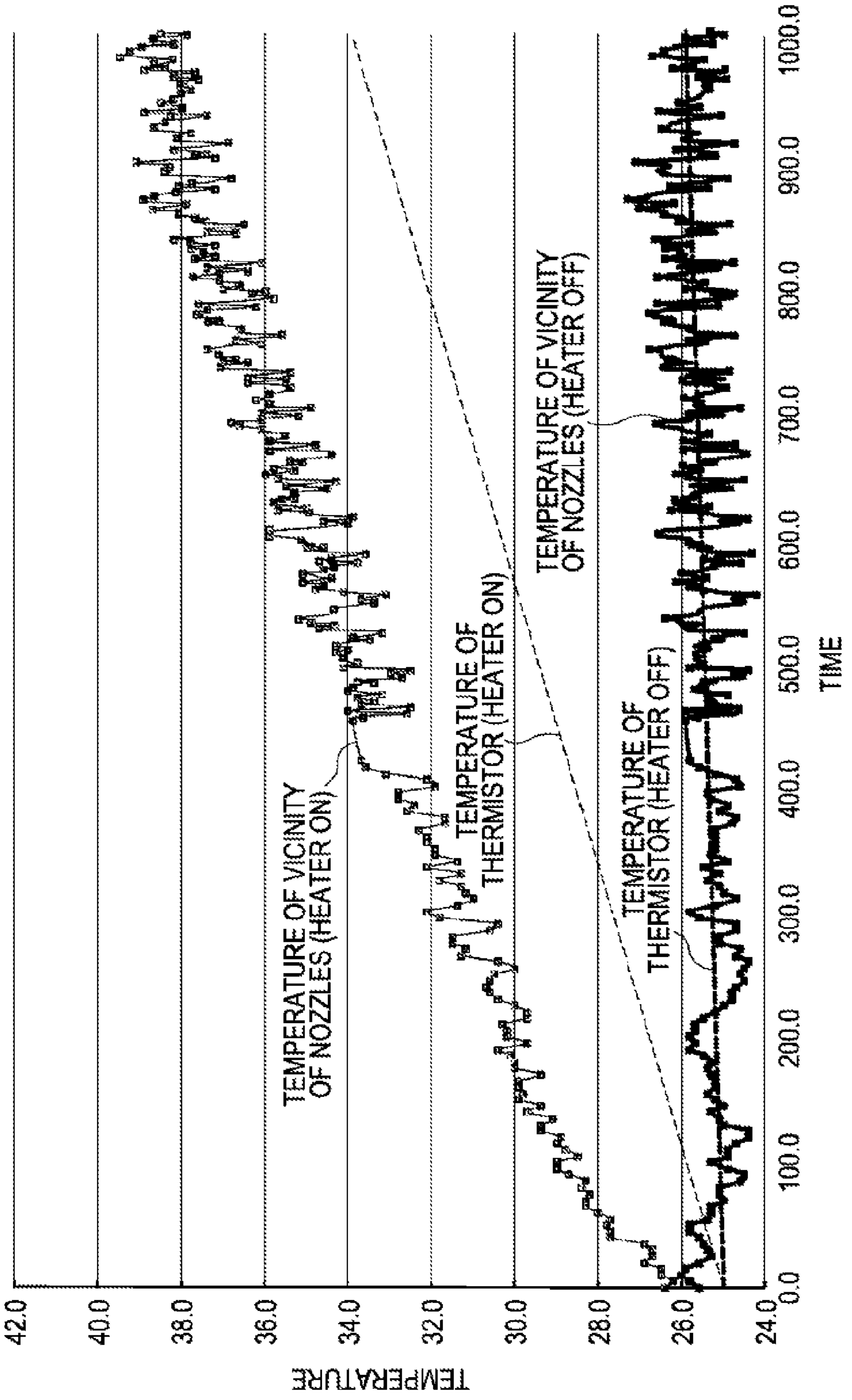
FIG. 6 is a graph for comparing the temperature of a thermistor to the temperature of the vicinity of nozzles.

FIG. 6 is a graph for comparing a temperature Tth of the thermistor and a temperature Tnz of the vicinity of the nozzles. In FIG. 6, the temperature Tth of the thermistor and the temperature Tnz of the vicinity of the nozzles at the time of using the platen heater 80 (turning on the heater) are shown and the temperature Tth of the thermistor and the temperature Tnz of the vicinity of the nozzles at the time of not using the platen heater 80 (turning off the heater) are shown. In addition, since the temperature Tnz of the vicinity of the nozzles is considered as the temperature of the ink in the vicinity of the nozzles, the temperature Tnz of the vicinity of the nozzles will be described as the temperature of the ink below in this embodiment.

When the platen heater 80 is not used, the temperature Tth of the thermistor and the temperature Tnz of the vicinity of the nozzles are almost equal to each other. However, when the platen heater 80 is used, the temperature Tth of the thermistor and the temperature Tnz of the vicinity of the nozzles are different from each other and the temperature Tnz of the vicinity of the nozzles is higher than the temperature Tth of the thermistor. That is because the nozzles are closer to the platen heater 80 than the thermistor 51. Accordingly, when the platen heater 80 is used, the temperature Tnz of the vicinity of the nozzles is influenced by heat from the platen heater 80. In addition, the temperature Tnz of the vicinity of the nozzles becomes different from the temperature Tth of the thermistor.

As described below, the head 41 is deprived of much heat due to ink ejection, when an ejection duty of the ink droplets is high. Accordingly, it can be reckoned that the temperature Tnz of the vicinity of the nozzles is lowered up to a surrounding ambient temperature Ten.

Mount Location of Thermistor 51

Figure 7:
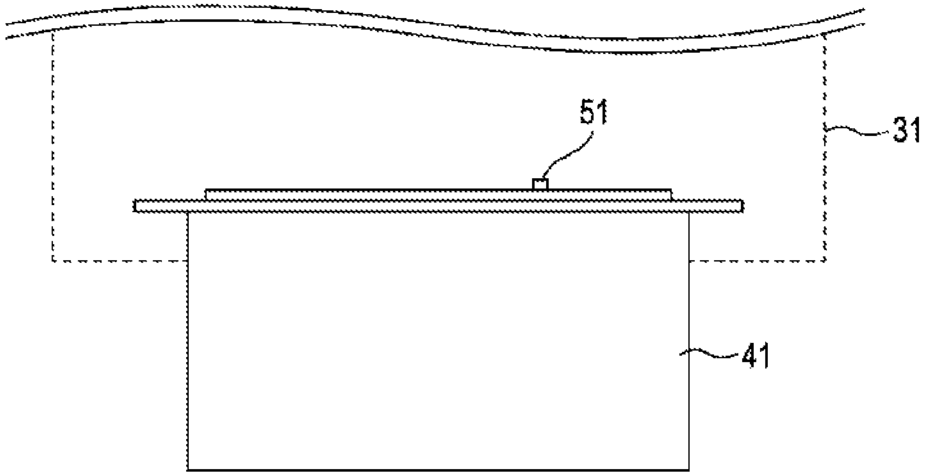
FIG. 7 is a diagram for explaining a mount location of the thermistor.

FIG. 7 is a diagram for explaining a mount location of the thermistor 51. FIG. 7 shows that the thermistor 51 is mounted in the upper portion of the head 41. The nozzles are located in the lowermost portion of the head 41. At this time, since the vicinity of the nozzles is heated by the platen heater 80 or deprived of heat thereof due to the ink ejection, the temperature of the vicinity of the nozzles becomes different from the temperature obtained by the thermistor 51.

When the driving signal COM is generated, the amplitude of the driving signal is varied in accordance with the temperature of the ink. Accordingly, if the thermistor 51 is mounted in the vicinity of the nozzles or on a location where the temperature of the ink can be obtained, the amplitude of the driving signal can be varied in accordance with the temperature of the ink, thereby generating the driving signal in accordance with the temperature of the ink. However, in the head 41 according to this embodiment, there is a circumstance where the thermistor 51 cannot be mounted on the location where the temperature of the ink can be obtained.

For example, a case where the thermistor 51 is mounted on the lowermost portion of the head 41 will be explained with reference to FIG. 2B. The sheet S passes between the head 41 and the platen heater 80. In order to improve a precision for landing the ink droplets ejected from the head 41 on the sheet S, a distance between the nozzles of the head 41 and the sheet S is set to be close to each other. For this reason, when the front end of the sheet S is curled, for example, the front end of the sheet S may touch with the lower portion of the head 41 and the thermistor 51. Alternatively, even when the front end of the sheet S does not touch with the thermistor 51, the sheet S does not pass between the head 41 and the platen 24 and thus may be jammed in the vicinity below the head 41. In this case, the thermistor 51 may be damaged due to the touch to the jammed sheet S, or an exact temperature may not be measured due to contamination of the thermistor 51. When the distance between the head 41 and the platen 24 is made larger in order to solve this problem, a travel distance of the ink droplets becomes longer, thereby deteriorating the precision for landing the ink droplets.

Alternatively, a case where the thermistor 51 is mounted inside the head 41 can be considered. In this case, when the thermistor 51 is provided in any one of the pressure chamber 451, the ink supply port 452, and the reservoir 453 in which the ink flows due to conductivity of the ink, it is necessary to provide the thermistor 51 in the vicinity of the any one of the ink pressure chamber 451, the ink supply port 452, and the reservoir 453 in order to ensure an insulation property therewith. Moreover, it is necessary to extract and form a signal line from the inside of the head to the outside. Accordingly, since an installation space is required, a manufacturing cost may be increased.

The piezo elements 421 generate heat when the piezo elements 421 expand or contract with application of the driving signal COM. Then, when the thermistor 51 is mounted in the vicinity of the piezo elements 421, a temperature more strongly influenced by the temperature of the piezo elements 421 than the temperature of the ink may be obtained. Therefore, it is necessary to mount the thermistor 51 so as not to be influenced by the temperature of the piezo elements 421.

When the thermistor 51 can be easily mounted on the upper portion of the head 41 and the platen heater 80 is not used, it is easy to obtain the temperature of the vicinity of the head 41 and it is possible to generate the driving signal COM on the basis of the obtained temperature information.

Alternatively, when the thermistor 51 is mounted on the upper portion of the head 41 and the platen heater 80 is used, the temperature of the lower portion of the head 41 heated by the platen heater 80 is transferred to the upper portion of the head 41 through the case 43. In this case, a temperature associated with the temperature of the ink in the head 41 heated by the platen heater 80 can be obtained from the upper portion of the head 41. Accordingly, when the thermistor 51 is mounted on the upper portion of the head 41 and even when the platen heater 80 is used, the driving signal COM can be also generated in accordance with the temperature of the ink by guessing the temperature Tnz (the temperature of the ink) of the vicinity of the nozzles on the basis of the temperature Tth of the thermistor.

In consequence, in this embodiment, it is configured that the thermistor 51 is mounted on the upper portion of the head 41.

Method of Correcting Driving Signal

In this embodiment, when the platen heater 80 is not used, the temperature Tth of the thermistor is guessed as the temperature Tnz (the temperature of the ink) of the vicinity of the nozzles to correct the driving signal, as described below. Alternatively, when the platen heater 80 is used and the ejection duty described below is higher than a predetermined ejection duty, the ambient temperature Ten is guessed on the basis of the temperature Tth of the thermistor. The driving signal is corrected so that the guessed ambient temperature Ten is set as the temperature Tnz of the vicinity of the nozzles.

Alternatively, when the platen heater 80 is used and the ejection duty is equal to or less than the predetermined duty, a correction value Toff is calculated on the basis of the temperature Tth of the thermistor. Then, an additive value of the temperature Tth of the thermistor and the correction value Toff is guessed as the temperature Tnz of the vicinity of the nozzles, and the driving signal is corrected.

Here, the temperature Tnz of the vicinity of the nozzles is guessed on the basis of the temperature Tth of the thermistor, but it can be conversely seen that the temperature Tth of the thermistor is corrected to calculate the temperature Tnz of the vicinity of the nozzles. Accordingly, the guessing of the temperature Tnz of the vicinity of the nozzles on the basis of the temperature Tth of the thermistor corresponds to the correcting of the temperature Tth of the thermistor as the temperature information.

Figure 8:
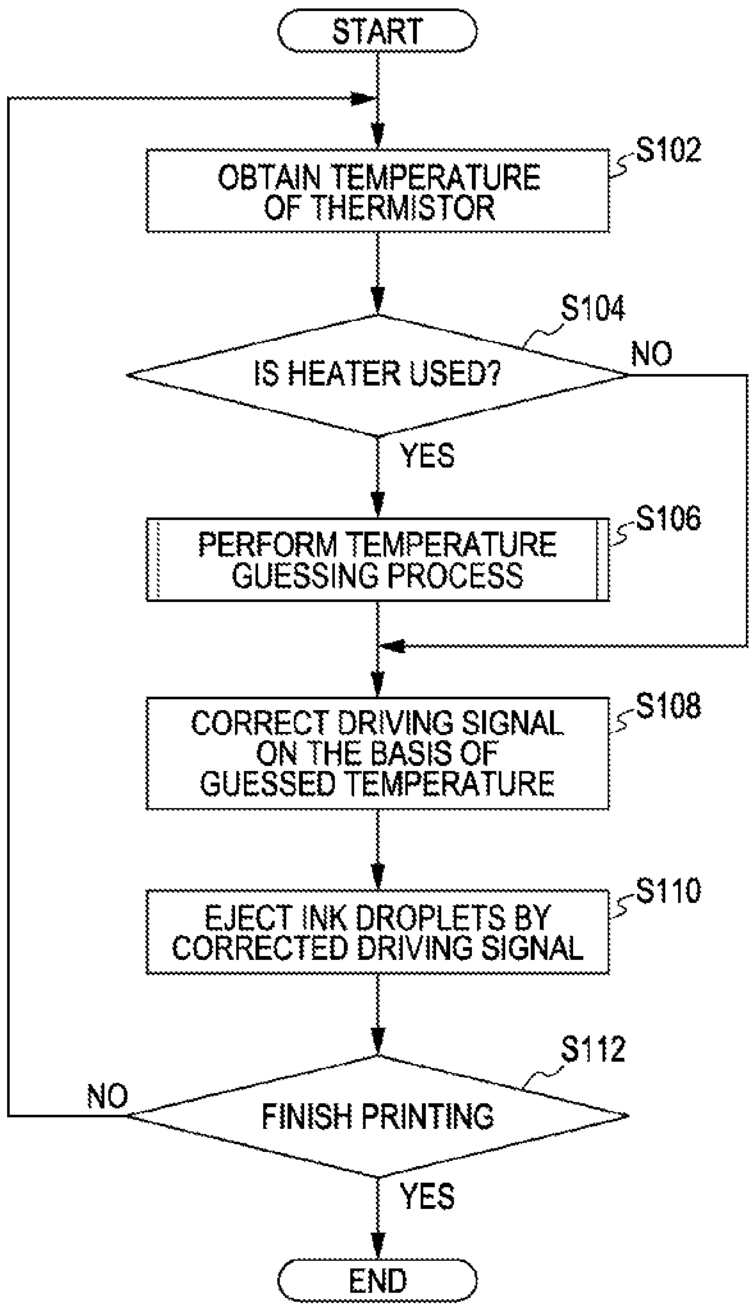
FIG. 8 is a flowchart for explaining a correction method of the driving signal according to an embodiment.

FIG. 8 is a flowchart for explaining a method of correcting the driving signal according to this embodiment. Hereinafter, the method of correcting the driving signal will be described with reference to this flowchart.

First, the temperature Tth of the thermistor is obtained by the thermistor 51, and then the obtained temperature Tth of the thermistor is sent to the controller (S102).

Subsequently, it is determined whether the platen heater 80 is used (S104). Since the controller 60 controls the use or nonuse of the platen heater 80, the controller 60 can know the use and nonuse. Here, the fact that the platen heater 80 "is used" means time when the platen heater 80 is maintained with a predetermined temperature (45° C.)

When the platen heater 80 is not used, the temperature inside the printer 1 is almost uniform. Therefore, it can be considered that the temperature Tnz of the vicinity of the nozzles is almost the same as the temperature Tth of the thermistor. Accordingly, the temperature Tth of the thermistor is guessed as the temperature Tnz of the vicinity of the nozzles. Then, the process proceeds to Step S108.

Alternatively, when the platen heater 80 is used, the temperature Tnz of the vicinity of the nozzles becomes different from the temperature Tth of the thermistor. Accordingly, a temperature guessing process of guessing the temperature of the ink is performed on the basis of the temperature Tth of the thermistor obtained by the thermistor 51 (S106).

Figure 9:
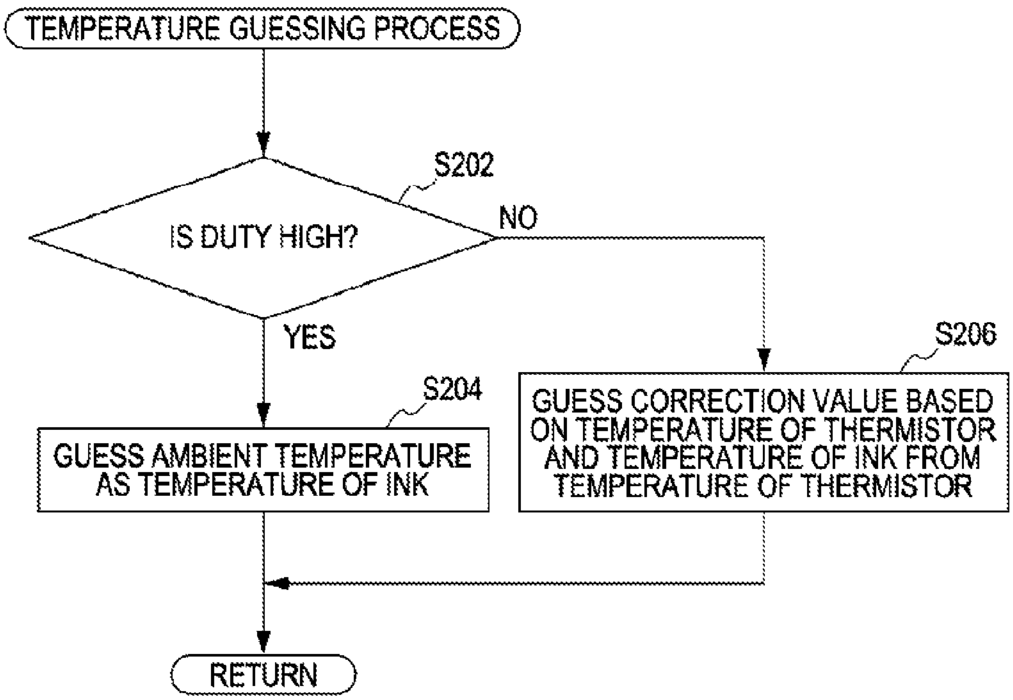
FIG. 9 is a flowchart for explaining a temperature guessing process.

FIG. 9 is a flowchart illustrating the temperature guessing process. When the temperature guessing process is called, it is determined whether the ejection duty of the ink is higher than the predetermined value. When the ejection duty is higher than the predetermined value, the ambient temperature Ten is calculated on the basis of the obtained temperature Tth of the thermistor. Then, the ambient temperature Ten is guessed as the temperature Tnz of the vicinity of the nozzles (S204).

The ejection duty can be calculated in the following manner, for example. Printer data are sent from the computer 110 to the printer 1. The print data contain pixel data indicating whether ink droplets of respective ink colors are ejected in each pixel on the sheet. The pixel data contain one of data representing non-ejection of the ink droplets, data representing ejection of the ink droplets for a small-sized dot, data representing ejection of the ink droplets for a middle-sized dot, and data representing ejection of the ink droplets for a large-sized dot.

When the printer data are received, the controller 60 determines which dot is formed in each pixel. For example, in the case of no dot, a value of "0" is assigned. In the case of the small-sized dot, a value of "30" is assigned. In the case of the middle-sized dot, a value of "60" is assigned. In the case of the large-sized dot, a value of "100" is assigned. A sum of values of all pixels for one page sheet is calculated. Then, the calculated value is set as the ejection duty for one page sheet. In this way, when an amount of ink to be ejected on the sheet is small, the ejection duty is obtained so as to have a small value. When the amount of ink to be ejected on the sheet is large, the ejection duty is obtained so as to have a large value.

Here, the ejection duty per each page has been calculated, but the ejection duty per a predetermined area may be calculated.

The ejection duty obtained in this manner is stored in the memory 63. When a next page sheet is printed, the ejection duty is used to determine whether the ejection duty is high.

Figures 10A, 10B:
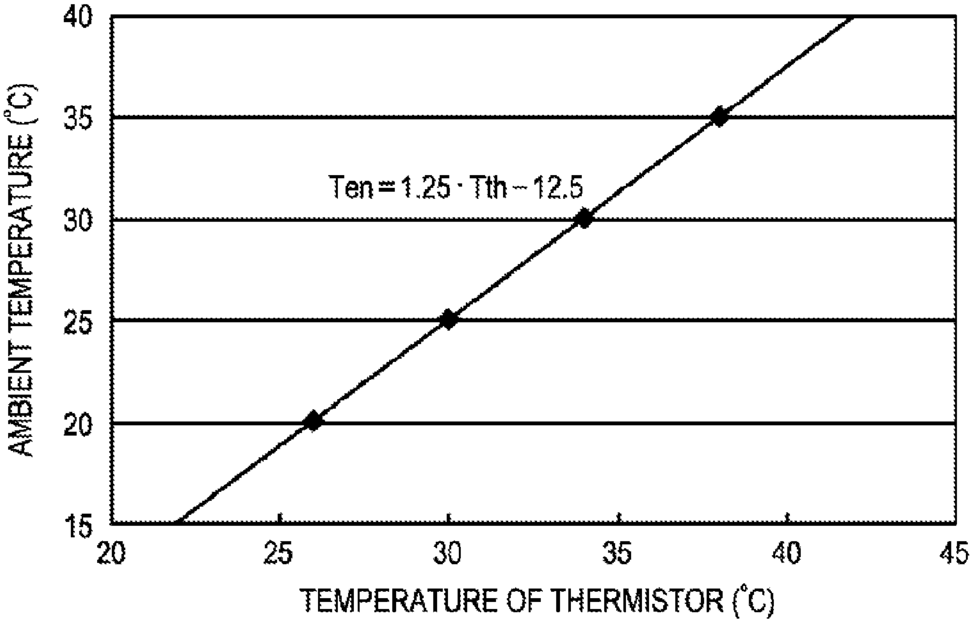
FIG. 10A is a diagram showing a relation between the temperature of the thermistor and an ambient temperature.
FIG. 10B is a graph showing the relation between the temperature of the thermistor and the ambient temperature.

FIG. 10A is a table showing a relation between the temperature Tth of the thermistor and the ambient temperature Ten. FIG. 10B is a graph showing the relation between the temperature Tth of the thermistor and the ambient temperature Ten. In this embodiment, referring to FIGS. 10A and 10B, it can be known that the relation between the temperature Tth of the thermistor and the ambient temperature Ten can be represented as a relation expression: $Ten=1.25\cdot Tth-12.5$. This relation expression is calculated in advance to be stored in the memory 63 of the controller 60. In addition, the controller 60 can calculate the ambient temperature Ten on the basis of the obtained temperature Tth of the thermistor.

Here, the ambient temperature Ten obtained on the basis of the temperature Tth of the thermistor is set to be lower than the temperature Tth of the thermistor. Here, that is because the ejection duty of the ink is higher than the predetermined duty but since the numerous ink droplets are ejected in a case of a high ejection duty, the temperature of the ink in the head becomes the ambient temperature Ten in order to rapidly supply the ink having the ambient temperature Ten to the head from an ink tank (not shown) disposed away from the head without an influence of the heat of the platen heater 80.

In this way, it is possible to guess the temperature Tnz (the temperature of the ink) of the vicinity of the nozzles on the basis of the temperature Tth of the thermistor. A method of calculating the relation between the temperature Tth of the thermistor and the ambient temperature Ten is described below.

Alternatively, when a thermistor capable of acquiring the ambient temperature Ten is separately provided in the vicinity or the like of the printer 1 which is not influenced by the heat of the platen heater 80, it is not necessary to guess the ambient temperature Ten on the basis of the temperature Tth of the thermistor. In this embodiment, however, the reason for not providing the separate thermistor capable of acquiring the ambient temperature Ten in the printer 1 is to reduce cost by decreasing the number of components or to avoid a complicated control method of selecting temperature information on a plurality of the thermistors in accordance with a condition and controlling a printing apparatus.

In Step S202, when it is determined that the ejection duty is equal to or less than the predetermined value, the temperature Tnz of the vicinity of the nozzles is guessed from the temperature Tth of the thermistor and the correction value Toff obtained on the basis of the temperature Tth of the thermistor (S206). The temperature Tnz of the vicinity of the nozzles is calculated by use of an equation: $Tnz=Tth+Toff$, where Tth is the temperature of the thermistor and Toff is the correction value.

When the ejection duty is low, a ratio of heat dissipated from the head 41 by the ink ejection is low. That is, it is difficult to lower the temperature of the vicinity of the nozzles of the head 41 by the ink ejection and this temperature is strongly influenced by the heat from the platen heater 80. In addition, the heat reaches the thermistor 51 through the head 41. Accordingly, the temperature Tth of the thermistor is higher than the ambient temperature Ten. The thermistor 51 is provided so as to be more away from the platen heater 80 than from the vicinity of the nozzles. With such a configuration, the temperature Tth of the thermistor is lower than the temperature Tnz of the vicinity of the nozzles. That is, in this case, the temperature Tth of the thermistor is higher than the ambient temperature Ten and lower than the temperature Tnz of the vicinity of the nozzles.

Figures 11A, 11B, 12:
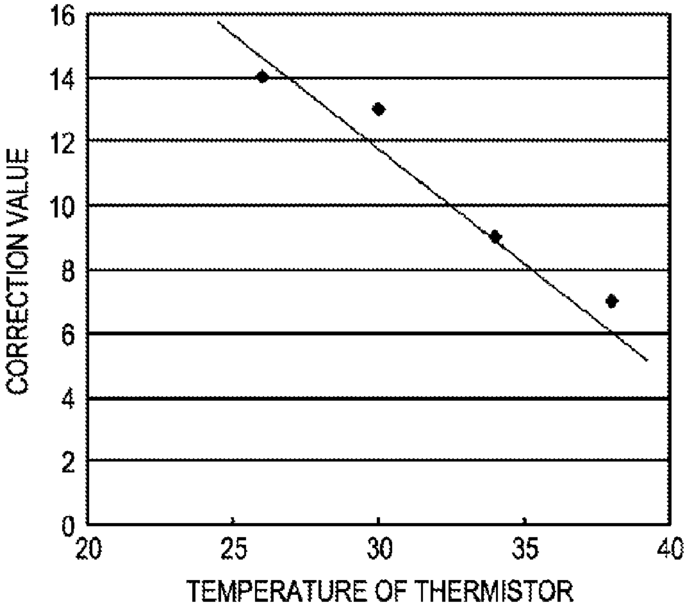
FIG. 11A is a table showing a relation between the temperature of the thermistor and a correction value.
FIG. 11B is a graph showing the relation between the temperature of the thermistor and the correction value.
FIG. 12 is a table showing the temperatures of a selected platen heater in a relation between kinds of media to be used and kinds of ink.

FIG. 11A is a table showing a relation between the temperature Tth of the thermistor and the correction value Toff. FIG. 11B is a graph showing the relation between the temperature Tth of the thermistor and the correction value Toff. Referring to FIGS. 11A and 11B, it can be known that the relation between the temperature Tth of the thermistor and the correction value Toff is expressed as a linear function. This relational expression is obtained in advance to be stored in the memory 63 of the controller 60. The controller 60 is configured to calculate the correction value Toff on the basis of the obtained temperature Tth of the thermistor.

By calculating the correction value Toff and substituting the correction value Toff in the expression used to calculate the temperature Tnz, the temperature of the ink can be guessed on the basis of the temperature Tth of the thermistor. A method of evaluating the relation between the temperature Tth of the thermistor and the correction value Toff used in this embodiment is described below.

In this way, when the temperature Tnz (the temperature of the ink) of the vicinity of the nozzles is guessed, the driving signal is corrected on the basis of the guessed temperature (S108). The guessed ambient temperature is sent to the controller 60. The controller 60 stores data on coordinates to be used to generate the driving signal according to the ambient temperature and the temperature Tnz of the vicinity of the nozzles in the memory 63. Accordingly, the controller 60 reads the data on the coordinates to be used to generate the driving signal according to the temperature Tnz (the temperature of the ink) of the vicinity of the nozzles from the memory 63 and sends the data to the driving signal generating circuit 70. The driving signal generating circuit 70 generates the driving signal COM according to the ambient temperature and sends the driving signal COM to the head unit 40. In this way, it is possible to eject the ink droplets having an appropriate size, when the platen heater 80 is not used.

When the driving signal COM is generated, the driving signal COM is applied to the piezo elements 421 and the ink droplets are ejected from the nozzles (S110).

In this way, it is possible to eject the ink droplets having a uniform size irrespective of the temperature of the ink by generating the driving signals COM different from each other, when the platen heater 80 is used or when the platen heater 80 is not used.

The controller 60 makes an interrupt at a predetermined time interval to determine whether printing finishes (S112). When it is determined that the printing finishes, this flow ends. Alternatively, when it is determined that the printing does not finish, the process returns to Step S102 to obtain the temperature Tth of the thermistor. In this way, it is possible to generate the driving signal COM according to the variation in the temperature, even when the temperature is varied during the printing.

Here, the method of guessing the temperature Tnz of the vicinity of the nozzles is different depending on the ejection duty in the temperature guessing process (S106). However, the guessing method may be different depending on the flow volume of ink. Even in this case, the ink droplets having which size in each pixel are specified on the basis of the pixel data. Since an amount of ink droplets ejected in accordance with a dot size is determined, the total amount of ink droplets ejected in accordance with the ink droplet having which size in which pixel can be calculated. By dividing the total amount of ink droplets calculated in this manner by time required to eject the total amount of ink droplets, it is possible to calculate the flow volume of ink per unit time. When the flow volume of ink exceeds a predetermined flow volume, Step S204 may be carried out. Alternatively, the flow volume of ink is equal to or less than the predetermined flow volume, Step S206 may be carried out.

The ink volume of ink may be more directly acquired by providing a sensor detecting the ink flow volume in an ink passage or an ink tank (not shown) and a method of guessing the temperature of the vicinity of the nozzles on the basis of information on the detected flow volume of the ink may be used in a different manner.

In the temperature guessing process (S106) according to the above-embodiment, the method of guessing the temperature Tnz of the vicinity of the nozzles is different depending on whether the ejection duty is high. However, the invention is not limited thereto.

For example, the temperature Tnz of the vicinity of the nozzles may be calculated by one of the methods (Steps S204 or S206), irrespective of the ejection duty. An influence of the ambient temperature Ten and the platen heater 80 on the temperature Tnz (the temperature of the ink) of the vicinity of the nozzles is also different depending on the shape of the head 41, the inner structure of the printer 1, or the like. The method of guessing the temperature Tnz of the vicinity of the nozzles is not limited to the above-described embodiment, but may be determined according to an influence of the heat generated from the platen heater 80 on the head temperature of the printer or the temperature of the ink inside the head.

FIG. 12 is a table showing the temperatures of a platen heater selected from a relation between kinds of media and kinds of ink to be used. FIG. 12 shows the temperatures of the platen heater when the kinds of media are a film, a sheet (its sheet thickness is thin), and a sheet (its sheet thickness is thick) and when the kinds of ink are water-based ink and oil-based ink.

In the above-described embodiment, the case where the temperature of the platen heater is set to 45° C. has been described, but the temperature of the platen heater is not limited thereto. As shown in FIG. 12, the temperature of the platen heater may be set to 50° C. in accordance with a combination of the kinds of media and the kinds of ink, for example. That is, another temperature may be set.

The kinds of media, the kinds of ink, and the setting temperatures of the platen heater 80 shown in the table are just examples. Other setting temperatures other than the setting temperatures of the platen heater 80 may be used. Alternatively, other kinds of media and other kinds of ink may be used. When the setting temperature of the platen heater 80 is changed, a degree of lowering the temperature also becomes different depending on a distance from the platen. Accordingly, when the setting temperature of the platen heater 80 is different, the temperature of the vicinity of the nozzles and the temperature of the thermistor also become different. Therefore, various relation expressions and correction values different from the above-described relational expressions and correction values are prepared.

Method of Calculating Each Relational Expression

First, a method of calculating the relation expression for calculating the ambient temperature Ten, which has been used in Step S204 described above, on the basis of the temperature Tth of the thermistor will be described.

Figures 13A, 13B:
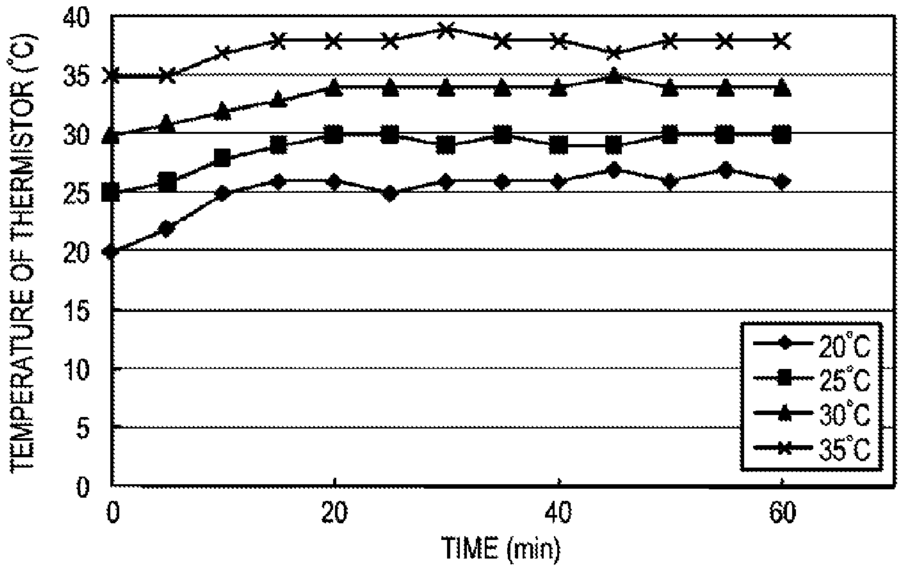
FIG. 13A is a table showing a variation in the temperature of the thermistor in accordance with the ambient temperature.
FIG. 13B is a graph showing the variation in the temperature of the thermistor in accordance with the ambient temperature.

FIG. 13A is a table showing a variation in the temperature Tth of the thermistor in accordance with the ambient temperature Ten. FIG. 13B is a graph showing the variation in the temperature Tth of the thermistor in accordance with the ambient temperature Ten. At the time of acquiring experimental values, a thermistor acquiring the ambient temperature Ten is separately prepared. The temperature Tth of the thermistor at the time of turning on the platen heater 80 and maintaining the temperature with 45° C. at each ambient temperature is acquired at a predetermined time interval.

Referring to the drawings, it can be known that the temperature of the thermistor at each of the ambient temperatures is almost normal, when the platen heater 80 is turned on and then about 25 minutes passes. That is, the temperature of the thermistor at each of the ambient temperatures at the time of maintaining the temperature of the platen heater 80 with 45° C. is almost uniquely determined. Accordingly, by storing this relation in advance, the ambient temperature Ten can be acquired on the basis of the temperature Tth of the thermistor. In addition, the reason for using data obtained when the platen heater 80 is turned on and then the temperature Tth of the thermistor becomes almost normal is that the temperature of the thermistor becomes almost normal at the time of turning on the heater to start a printing work.

Here, the ambient temperature Ten acquired when the temperature Tth of the thermistor is 26° C. is 20° C. The ambient temperature Ten acquired when the temperature Tth of the thermistor is 30° C. is 25° C. The ambient temperature Ten acquired when the temperature Tth of the thermistor is 34° C. is 30° C. The ambient temperature Ten acquired when the temperature Tth of the thermistor is 38° C. is 35° C. By interpolating the relation between the temperature Tth of the thermistor, which is not acquired by use of a linear function, and the ambient temperature Ten, the ambient temperature Ten for a certain temperature Tth of the thermistor can be acquired.

Next, a method of obtaining the relational expression for calculating the correction value Toff, which has been used in Step S206 described above, on the basis of the temperature Tth of the thermistor will be described.

Figure 15:
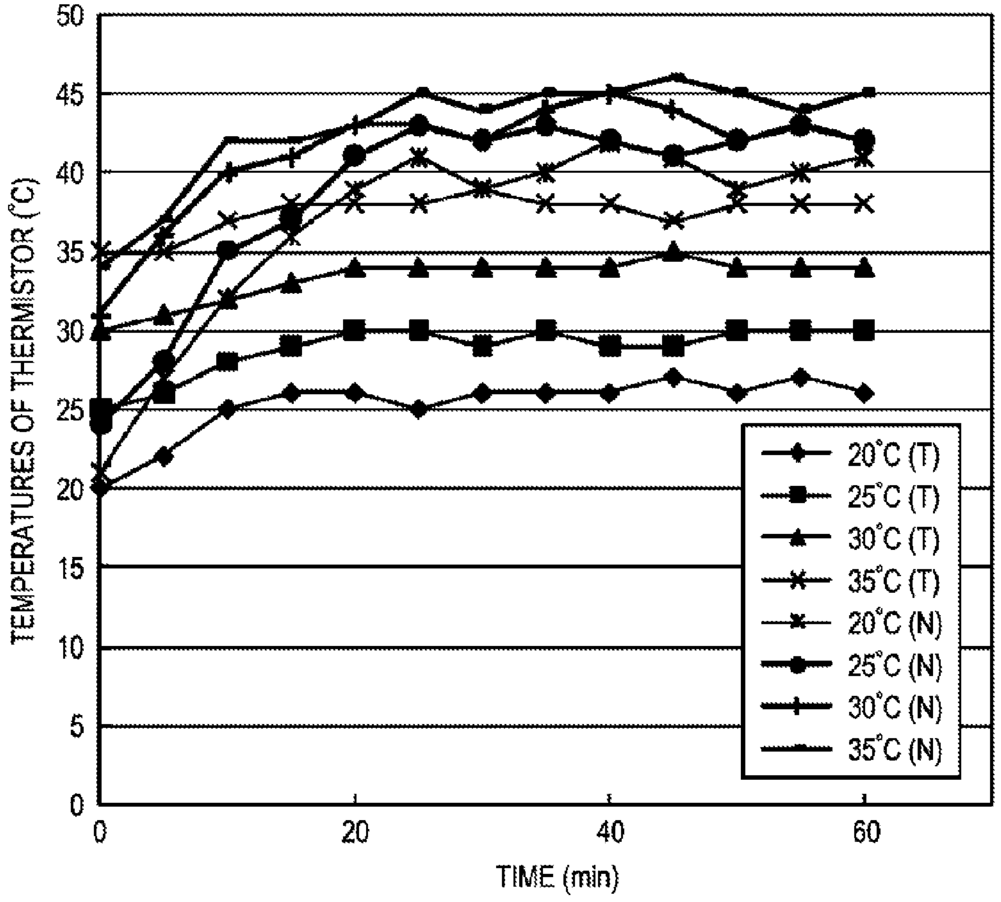
FIG. 15 is a graph showing the variation in the temperature of each thermistor and the variation in the temperature of the vicinity of the nozzles.

FIG. 14 is a table showing variations in the temperature Tth of the thermistor and the temperature Tnz of the vicinity of the nozzles at each of the ambient temperatures and showing the correction values Tnz for the temperatures. FIG. 15 is a graph showing the variations in each temperature Tth of the thermistor and each temperature Tnz of the vicinity of the nozzles. At the time of acquiring experimental values, a thermistor acquiring the ambient temperature Ten and a thermistor acquiring the temperature Tnz of the vicinity of the nozzles are separately prepared. The temperature Tth of the thermistor and the temperature Tnz of the vicinity of the nozzles at the time of turning on the platen heater 80 and maintaining the temperature with 45° C. at each of the ambient temperatures are acquired at a predetermined time interval. In addition, when the correction value is calculated, the temperature Tnz of the vicinity of the nozzles is acquired by disposing the thermistor in the vicinity of the nozzles of the head in the process. The correction value calculated in this manner can be used in controlling the same type of printing apparatus.

Referring to the drawings, it can be known that when the platen heater 80 is turned on and then about 25 minutes passes, the temperature Tth of the thermistor and the temperature Tnz of the vicinity of the nozzles at each of the ambient temperature become almost normal. That is, the temperature of the thermistor and the temperature of the vicinity of the nozzles at each of the ambient temperatures at the time of maintaining the temperature of the platen heater 80 with 45° C. are almost uniquely determined. Here, an average value of the temperatures Tth of the thermistor and an average value of the temperatures Tnz of the vicinity of the nozzles acquired when 25 minutes pass after temperature measurement are calculated after the measurement of the temperature is started.

When the above-described relational expression is modified, an expression for calculating the correction value is Toff=Tnz−Tth. The average value of the temperatures of the thermistor after temperature stabilization in FIG. 14 and the average value of the correction values after temperature stabilization are substituted to this expression. In this way, it is possible to calculate the correction value at each of the temperatures of the thermistor.

Here, when the temperature Tth of the thermistor is 26° C., the correction value Toff is 14° C. When the temperature Tth of the thermistor is 30° C., the correction value Toff is 13° C. When the temperature Tth of the thermistor is 34° C., the correction value Toff is 9° C. When the temperature Tth of the thermistor is 38° C., the correction value Toff is 7° C. By interpolating the relation between the temperature Tth of the thermistor which is not acquired by use of a linear function of this relation and the correction value Toff, it is possible to obtain the correction value Toff for a certain temperature Tth of the thermistor.

In this embodiment, the temperatures Tth of the thermistor, the temperatures Tnz of the vicinity of the nozzles, the correction values Toff are just examples. Since a heat dissipation method is different depending on the structure of a printing apparatus, these values may be also different. In this embodiment, the temperature Tth of the thermistor is varied in accordance with the ambient temperature Ten and the correction value Toff is varied in accordance with the ambient temperature Ten (or the temperature Tth of the thermistor). The invention is not limited to the above-described embodiment. For example, when the temperature Tnz of the vicinity of the nozzles or the temperature Tth of the thermistor is not varied in accordance with the ambient temperature Ten but is varied to be normally lower by a predetermined temperature than the temperature of the platen heater 80, the correction value Toff may not be varied in accordance with the ambient temperature Ten.

Other Embodiments

In the above-described embodiment, the heater corresponding to the heating unit is used as the platen heater 80, but the heater may be provided at another location. In the above-described embodiment, by providing the heater in the lower portion of the platen 24, the heater as the platen heater 80 is provided below a point through which a sheet passes. However, the heater may be provided above the point through which the sheet S passes. Alternatively, a heater which radiates energy rays such as infrared rays or ultraviolet rays or exposes hot air to a medium may be used.

A pre-heat method of heating the sheet S in advance by providing a heater on a more upstream side than the platen 24 in the transport direction of the sheet S may be used. Alternatively, a post-heat method of heating the sheet S after the ink droplets are landed by providing a heater on a more downstream side than the platen 24 in the transport direction of the sheet S may be used. Alternatively, the platen heater 80 and this heater may be used together.

In the above-described embodiment, the printer 1 is used as the liquid ejecting apparatus, but the invention is not limited thereto. For example, as well as the printing apparatus in which the carriage is moved, a printing apparatus in which the head is not moved and fixed may be used. For example, a full line type line printer may be used. In addition, a liquid ejecting apparatus may be realized which is capable of ejecting or discharging a fluid (a liquid-like material in which a fluid or particles of a functional material are dispersed or a colloidal material such as gel) other than ink. For example, a technique similar to that according to the above-described embodiment is applicable to various apparatuses applying an ink jet technique, such as a color filter manufacturing apparatus, a dying apparatus, a micro fabricated apparatus, a semiconductor manufacturing apparatus, a surface processing apparatus, a three-dimensional modeling apparatus, a gas vaporization apparatus, an organic EL manufacturing apparatus (particularly, a polymer EL manufacturing apparatus), a display manufacturing apparatus, a film forming apparatus, and a DNA chip manufacturing apparatus. These methods or the manufacturing methods are just a category of an application range.

The above-described embodiment has been described to understand the invention and is not considered as limitation of the invention. Modification or improvement of the invention can be made without departing the gist of the invention and the equivalents are included in the scope of the invention. In particular, an embodiment described below is included in the scope of the invention.

Head

In the above-described embodiment, ink is ejected by use of the piezo elements. However, the method of ejecting a liquid is not limited thereto. For example, another method such as a method of generating bubbles inside the nozzles by heat may be used.

What is claimed is:

1. A liquid ejecting apparatus comprising:

a heating unit which heats a medium;

a head which ejects a liquid onto the medium;

a sensor which is mounted on the head and outputs temperature information of the head, wherein movement of the medium toward a downstream side of the liquid ejecting apparatus positions the medium between the heating unit and the sensor, wherein the heating unit is configured to support the medium while the head ejects the liquid onto the medium; and a driving signal generating unit which generates a driving signal to be applied to the head in order to eject the liquid, wherein the driving signal generated by the driving signal generating unit differs in accordance with the temperature information, and wherein the driving signal generating unit is configured to correct an amplitude of a waveform of the driving signal.

2. The liquid ejecting apparatus according to claim 1, wherein the driving signal generating unit generates the driving signal and a waveform of the driving signal is corrected on the basis of the temperature information output by the sensor.

3. The liquid ejecting apparatus according to claim 2, wherein the temperature information is corrected upon using the heating unit and the driving signal generating unit generates the driving signal and the waveform of the driving signal is corrected on the basis of the corrected temperature information.

4. The liquid ejecting apparatus according to claim 3, wherein when the temperature information is corrected upon using the heating unit, a method of correcting the temperature information differs in accordance with whether an ejection amount of the liquid ejected onto the medium exceeds a predetermined amount.

5. The liquid ejecting apparatus according to claim 3, wherein the correction of the temperature information is performed using a correction expression different depending on a location where the heating unit is provided.

6. The liquid ejecting apparatus according to claim 2, wherein the sensor is mounted on an upper portion of the head.

7. The liquid ejecting apparatus according to claim 1, wherein the heating unit is disposed at a location opposed to ejection ports for the liquid in the head.

8. A liquid ejecting method comprising:

determining temperature information associated with a head of a liquid ejecting apparatus including a heating unit heating a medium, wherein movement of the medium toward a downstream side of the liquid ejecting apparatus positions the medium between the heating unit and a sensor providing temperature information;

generating a driving signal, wherein the driving signal differs in accordance with the temperature information and wherein the driving signal has an amplitude corrected waveform based upon the temperature and configured to eject the liquid based upon the temperature information of the liquid; and ejecting the liquid onto the medium opposed to the head by applying the generated driving signal having the amplitude corrected waveform to the head, wherein the heating unit supports the medium while the liquid is ejected onto the medium.

* * * * *